United States Patent
Khunte et al.

(10) Patent No.: US 12,472,964 B2
(45) Date of Patent: Nov. 18, 2025

(54) APPARATUSES, METHODS, AND SYSTEMS FOR AVOIDING UNINTENDED VEHICLE ACCELERATION

(71) Applicant: Cummins Inc., Columbus, IN (US)

(72) Inventors: Abhishek Khunte, Maharashtra (IN); Sujay Sirur, Maharashtra (IN)

(73) Assignee: Cummins Inc., Columbus, IN (US)

( * ) Notice: Subject to any disclaimer, the term of this patent is extended or adjusted under 35 U.S.C. 154(b) by 75 days.

(21) Appl. No.: 18/707,806

(22) PCT Filed: Oct. 19, 2022

(86) PCT No.: PCT/US2022/078335
§ 371 (c)(1),
(2) Date: May 6, 2024

(87) PCT Pub. No.: WO2023/086723
PCT Pub. Date: May 19, 2023

(65) Prior Publication Data
US 2024/0425069 A1    Dec. 26, 2024

Related U.S. Application Data

(60) Provisional application No. 63/263,889, filed on Nov. 11, 2021.

(51) Int. Cl.
*B60W 60/00*    (2020.01)
*B60K 28/10*    (2006.01)
*B60W 50/10*    (2012.01)

(52) U.S. Cl.
CPC ............ *B60W 50/10* (2013.01); *B60K 28/10* (2013.01); *B60W 2540/10* (2013.01); *B60W 2540/12* (2013.01)

(58) Field of Classification Search
CPC .. B60W 50/10; B60W 50/12; B60W 50/0098; B60W 2540/10; B60W 2540/12;
(Continued)

(56) References Cited

U.S. PATENT DOCUMENTS 6,881,174 B2    4/2005    McCall
8,494,743 B1    7/2013    Albertson
(Continued)

FOREIGN PATENT DOCUMENTS

KR    101187125    9/2012

OTHER PUBLICATIONS

International Search Report and Written Opinion for International patent application No. PCTUS2022078335, filed Oct. 19, 2022, mailed Jan. 6, 2023, 19 pgs.

*Primary Examiner* — Phutthiwat Wongwian
*Assistant Examiner* — Sherman D Manley
(74) *Attorney, Agent, or Firm* — Taft Stettinius & Hollister LLP

(57) ABSTRACT

A system and method for avoiding unintended acceleration is provided and includes a first integrated circuit-based electronic controller configured to receive acceleration and brake requests and provide a control output via a datalink dedicated to controlling a prime mover system of the vehicle, a three-axis accelerometer configured to provide acceleration outputs indicative of acceleration of the accelerometer relative to three dimensions, and a second integrated circuit-based electronic controller operative independently of the first integrated circuit-based controller configured to receive the acceleration and braking requests, receive the acceleration outputs of the three-axis accelerometer, and operatively coupled with the datalink. The second integrated circuit-based electronic controller is configured to determine an unintended acceleration event in response to (Continued)

the acceleration and braking requests, and the acceleration outputs of the three-axis accelerometer.

23 Claims, 9 Drawing Sheets

(58) Field of Classification Search
CPC ..... B60W 2520/201; B60W 60/00188; B60W 2420/905; B60W 30/02; B60W 30/04; B60K 28/10; B60K 28/14; B60T 7/12; B60T 8/96; B60T 17/18
See application file for complete search history.

(56) References Cited

U.S. PATENT DOCUMENTS

| | | | |
|---|---|---|---|
| 8,521,403 B2 | 8/2013 | Cook | |
| 8,548,712 B2 | 10/2013 | Oesterreicher et al. | |
| 8,744,671 B2 | 6/2014 | Abousleiman et al. | |
| 8,775,046 B2* | 7/2014 | Kaster | B60W 10/18 303/113.1 |
| 9,460,628 B2 | 10/2016 | Oppelland et al. | |
| 10,023,189 B2 | 7/2018 | Ko | |
| 2004/0059480 A1* | 3/2004 | Hrovat | B60G 17/0182 701/72 |
| 2004/0249545 A1* | 12/2004 | Lu | B60T 8/172 701/70 |
| 2007/0034440 A1 | 2/2007 | Zomotor | |
| 2012/0221209 A1* | 8/2012 | Tatsukawa | B60W 10/184 701/42 |
| 2013/0060442 A1 | 3/2013 | Kaster et al. | |
| 2015/0210291 A1* | 7/2015 | Hutten-Czapski | H04W 4/48 701/1 |
| 2016/0375882 A1 | 12/2016 | Trapp et al. | |
| 2017/0096147 A1* | 4/2017 | Hutten-Czapski | B60W 50/0098 |
| 2019/0128948 A1 | 5/2019 | Smith et al. | |
| 2020/0072178 A1 | 3/2020 | Berkson et al. | |

* cited by examiner

APPARATUSES, METHODS, AND SYSTEMS FOR AVOIDING UNINTENDED VEHICLE ACCELERATION

CROSS-REFERENCE

This application claims priority to and the benefit of International Patent Application No. PCT/US22/78335, filed Oct. 19, 2022, which claims priority to and the benefit of U.S. Provisional Application No. 63/263,889, filed Nov. 11, 2021, which are hereby incorporated by reference in their entirety.

TECHNICAL FIELD

The present disclosure relates generally apparatuses, methods, systems, and techniques of avoiding, detecting, interrupting, mitigating, and/or preventing unintended acceleration of a vehicle.

BACKGROUND

Unintended vehicle acceleration may arise in a number of vehicle operating scenarios including, for example, error conditions or malfunctions of a vehicle system or one or more of its constituent components and cyber-attacks in which malicious or otherwise unauthorized commands, data, messages, or signals are introduced into an electronic control system of a vehicle. Avoiding or preventing unintended acceleration in vehicles, for example, detecting and interrupting or mitigating unintended vehicle acceleration, remains an important safety goal. Existing approaches to preventing unintended vehicle acceleration suffer from a number of shortcomings and disadvantages including those respecting certification requirements, complexity, expense, failsafe operation, dependence on other systems and devices, reliability, robustness, safety standards, and other desirable features. There remains a substantial need for the unique apparatuses, systems, methods, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY

Example embodiments include unique apparatus, methods, and systems for avoiding, detecting, interrupting, mitigating, and/or preventing unintended acceleration of a vehicle. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

Figure 1:
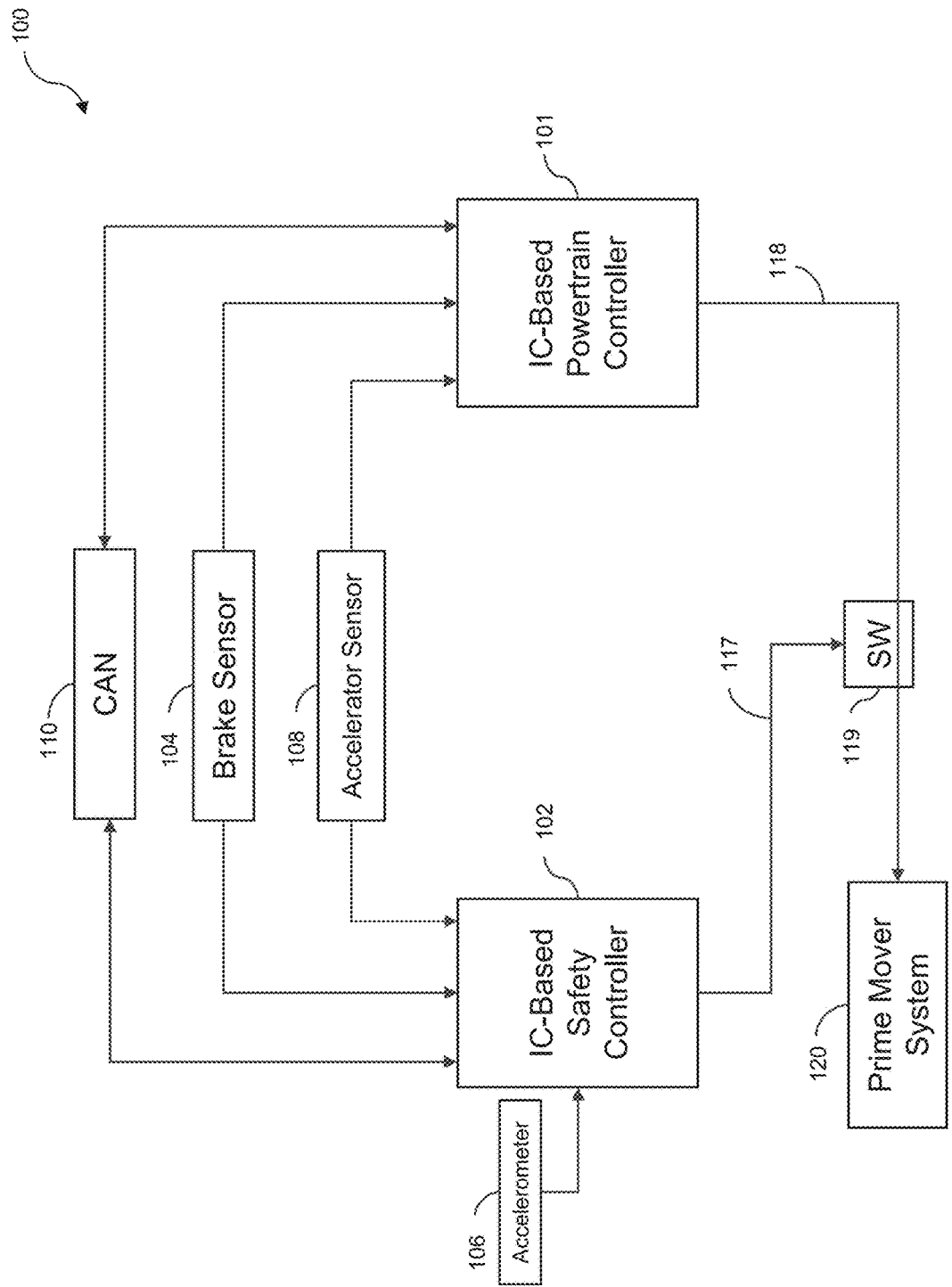
FIG. 1 is a schematic diagram illustrating certain aspects of an example vehicle electronic control system.

With reference to FIG. 1, there is illustrated a schematic view of an example vehicle electronic control system 100 (also referred to herein as "system 100") which is configured and operable to detect, interrupt, mitigate and/or prevent unintended acceleration of a vehicle such as acceleration not corresponding or deviating from the acceleration that should or is expected to result from a system control command such as an acceleration or braking command. System 100 includes an integrated circuit-based electronic powertrain controller 101 (also referred to herein as "controller 101") which is in operative communication with a brake sensor 104, an accelerator sensor 108, and a controller area network (CAN) 110.

Controller 101 is further configured to receive an input indicative of a braking request from brake sensor 104 and an input indicative of an acceleration request from accelerator sensor 108, to provide a control output via a datalink 118 dedicated to controlling a prime mover system 120 of a vehicle. Controller 101 is further configured to receive and transmit messages via CAN 110 to provide for communication with one or more other integrated circuit-based controllers which may be utilized in connection with a number of vehicle system control operations.

The control output provided by controller 101 via datalink 118 may be provided in a number of forms according to the form of the prime mover system 120 of the vehicle. In some example instances, the control output provided by controller 101 via datalink 118 may be determined wholly or partially in response to an input indicative of a braking request (e.g., the input from brake sensor 104). In some example instances, the control output provided by controller 101 via datalink 118 may be determined wholly or partially in response to an input indicative of an acceleration request (e.g., the inputs from accelerator sensor 108). In some example instances, the control output provided by controller 101 via datalink 118 may be determined wholly or partially in response to the input indicative of a braking request and the input indicative of an acceleration request. In some example instances, the control output provided by controller 101 via datalink 118 may be determined wholly or partially in response to additional or alternatives inputs.

In example embodiments where the prime mover system 120 includes a reciprocating piston internal combustion engine, the control output may be configured to control operation of one or more fueling system components such as a fuel injector or a fuel pump. In some such embodiments, the control output may be in the form of a signal (or the interruption of a signal) transmitted over a datalink in operative communication with the one or more fueling system components such as the fuel injector or the fuel pump. The signal (or the interruption of the signal) may be effective to completely interrupt or terminate operative communication, override operative communication, or provide other remedial effect or interference on such operative communication.

In example embodiments where the prime mover system 120 is provided in the form of an electric powertrain, the control output may be configured to control operation of one or more electric powertrain components such as an inverter or other power electronic components, and electric motor, a battery system, or combinations thereof. In some such embodiments, the control output may be in the form of a signal (or the interruption of a signal) provided on a high-voltage interlock loop which may be operatively coupled with each high-voltage component of an electric powertrain and may be selectably interruptible by any of the components with which it is operatively coupled. The signal (or the interruption of the signal) may be effective to completely interrupt or terminate operative communication, override operative communication, or provide other remedial effect or interference on such operative communication.

The brake sensor 104 may be provided in a number of forms. In some forms, the brake sensor 104 may be provided as a brake pedal position sensor configured to provide an indication of the position or actuation of a brake pedal by a vehicle driver. In some forms, the brake sensor 104 may be provided as a brake pedal position sensor or another vehicle system sensor configured to provide an indication of other types of commanded vehicle braking or a vehicle system response thereto, for example, a command of or response to a vehicle safety system or an autonomous vehicle system. In some forms, the brake sensor 104 may be another type of sensor configured to provide an input indicative of a braking request.

The accelerator sensor 108 may be provided in a number of forms. In some forms, the accelerator sensor 108 may be provided as an accelerator pedal position sensor configured to provide an indication of the position or actuation of an accelerator pedal by a vehicle driver. In some forms, the accelerator sensor 108 may be provided as an accelerator pedal position sensor or another vehicle system sensor configured to provide an indication of other types of commanded vehicle acceleration or a vehicle system response thereto, for example, a command of or response to a vehicle safety system or an autonomous vehicle system. In some forms, the accelerator sensor 108 may be another type of sensor configured to provide an input indicative of an accelerator request.

System 100 includes an integrated circuit-based electronic safety controller 102 (also referred to herein as "controller 102") which is in operative communication with the brake sensor 104, the accelerator sensor 108, and the CAN 110. Controller 102 is configured to receive an input indicative of a braking request from brake sensor 104 and an input indicative of an acceleration request from accelerator sensor 108 which may be of substantially the same type as any of the forms or embodiments described in connection with controller 101. Controller 102 is further configured to receive and transmit messages via CAN 110 to provide for communication with one or more other integrated circuit-based controllers which may be utilized in connection with a number of vehicle system control operations.

Controller 102 is in operative communication with the accelerometer 106 which is preferably provided in the form of a three-axis accelerometer configured to provide input to controller 102 indicative of acceleration of the accelerometer 106 in three dimensions or axes, for example, the X, Y, and Z directions of a Cartesian coordinate system or other types of coordinate system information or information that can be mapped to one or more coordinate systems as will occur to one of skill in the art with the benefit and insight of the present disclosure. It shall be appreciated that three-axis information output by the accelerometer 206 can be used to automatically calibrate and account for mounting position and offset of the accelerometer 206 as well as the position of the vehicle system in which the accelerometer 206 is provided. Additionally, with three-axis information output by the accelerometer 206 can be utilized to distinguish between road grade and acceleration.

Controller 102 is in operative communication with a switch 119 via communication path 117. Switch 119 is operatively coupled with the datalink 118 and is controllable by the controller 102 to selectably interrupt communication or signaling over datalink 118 in response to one or more determinations made by controller 102. Controller 102 may be configured to determine a vehicle orientation limit event in response to the acceleration outputs of the accelerometer 106 and operate the switch 119 to interrupt communication of the control output from the controller 101 to the prime mover system 120 of the vehicle in response to the vehicle orientation limit event. Controller 102 may be additionally or alternatively configured to determine an unintended acceleration event in response to the inputs received from accelerometer 106 and at least one of an acceleration request received from accelerator sensor 108, a braking request received from brake sensor 104, and to operate the switch 119 to interrupt communication of the control output from controller 101 to prime mover system 120 of the vehicle in response to the unintended acceleration event.

Figure 2A:
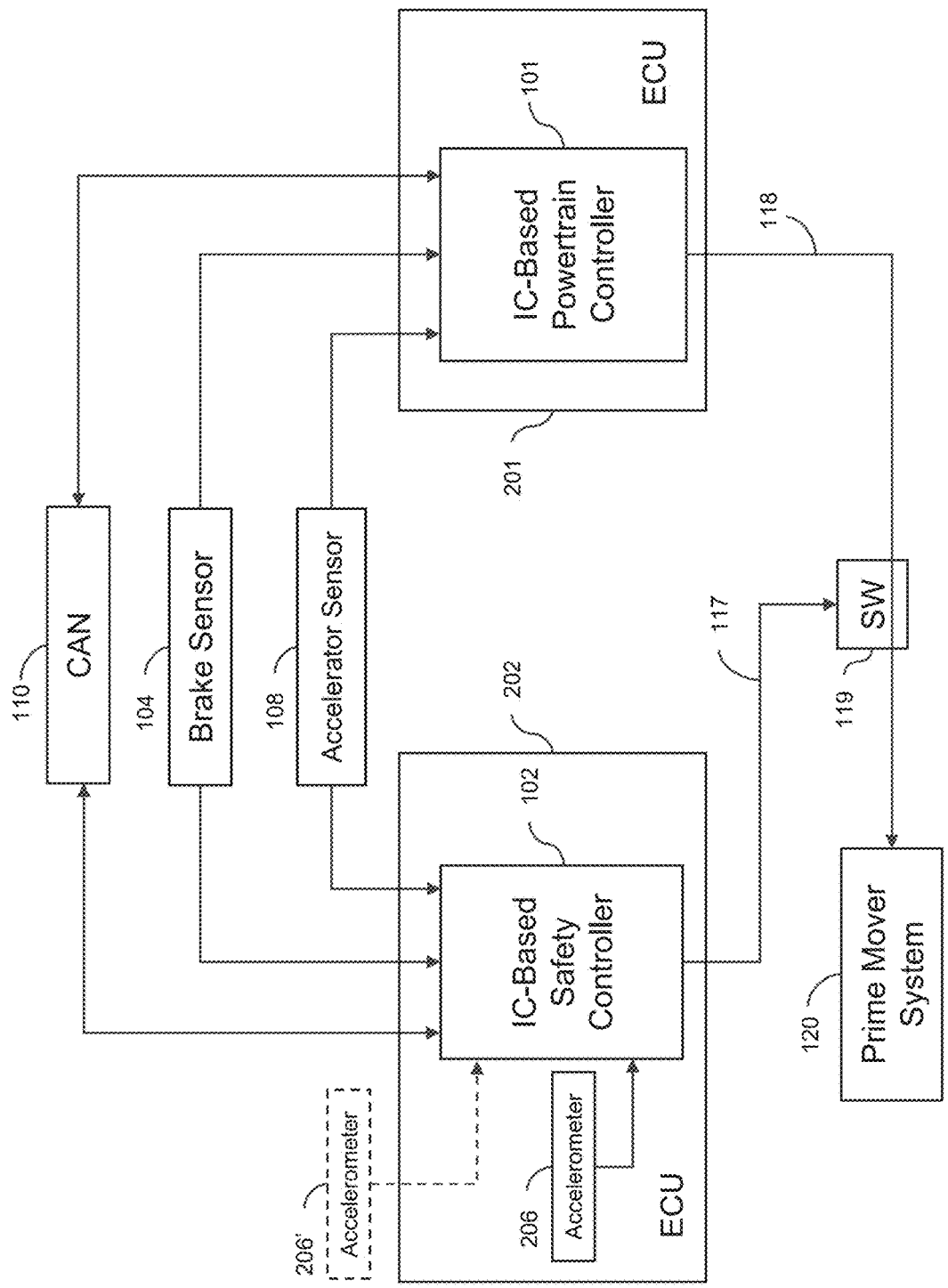
FIGS. 2A, 2B, and 2C are schematic diagrams illustrating certain further aspects of several example embodiments of the example vehicle electronic control system of FIG. 1.

It shall be appreciated that controller 101 and controller 102 may be provided in a number of embodiments in which controller 102 is functionally independent from and, at least in part, structurally separate and distinct from controller 101, several examples of which shall now be described. In some example embodiments, controller 101 may be provided in or as a component of a first electronic control unit (ECU) (sometimes referred to as an electronic control module (ECM)) and controller 102 may be provided in or as a component of a separate ECU. As illustrated in FIG. 2A, for example, controller 101 is provided in ECU 201 and controller 102 is provided in a separate ECU 202. It shall be further appreciated that in such embodiments the accelerometer in operative communication with controller 102 may be provided in or as a component of ECU 202, such as illustrated by accelerometer 206, or may be provided as a separate component in operative communication with ECU 202, such as illustrated by accelerometer 206'.

Figure 2B:
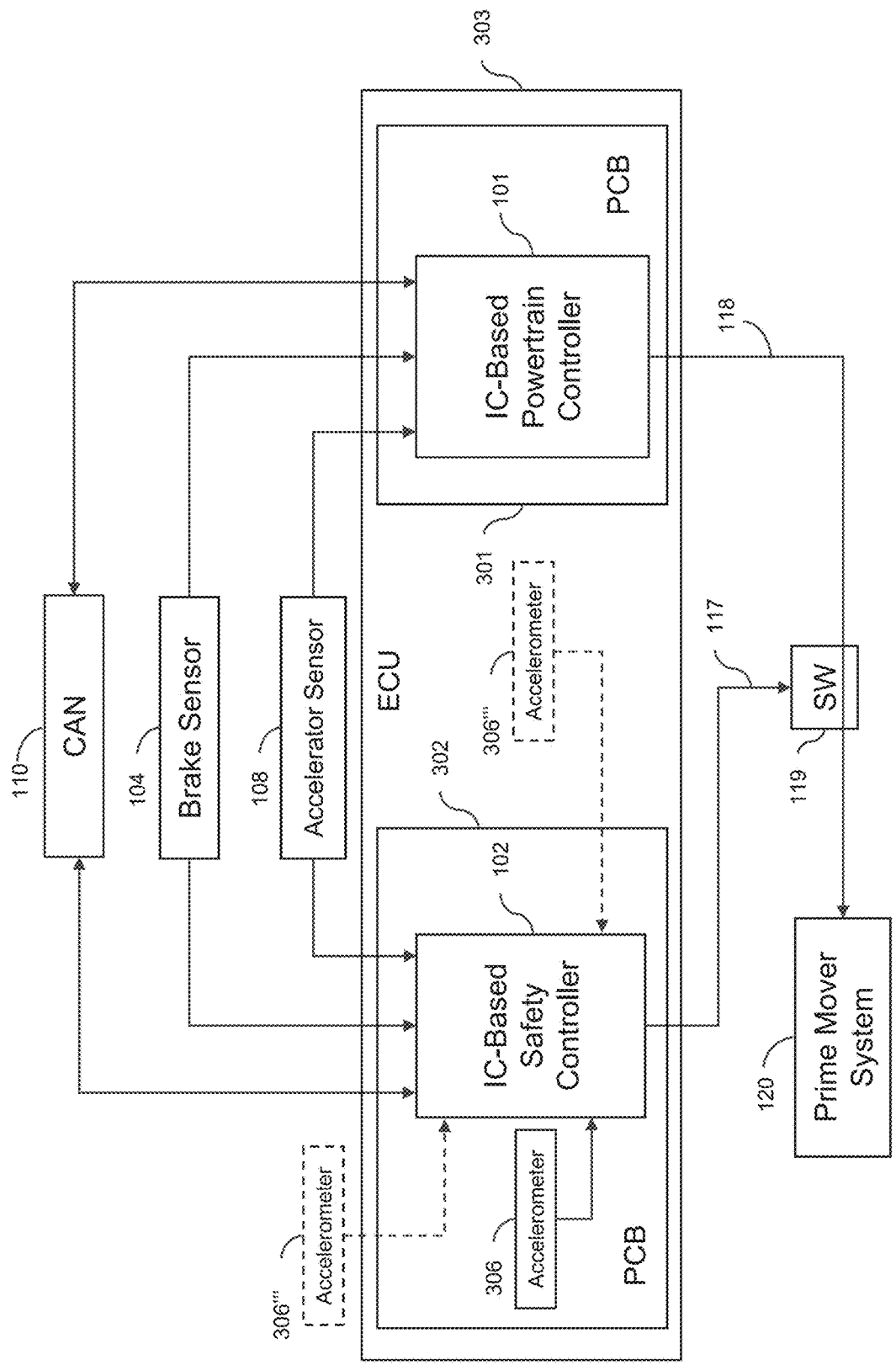

In some example embodiments, controller 101 may be provided as one or more components of a first circuit board such as a first printed circuit board (PCB) and controller 102 may be provided as one or more components of a second circuit board such as a second PCB. Furthermore, in some such embodiments, the first circuit board and the second circuit board may be provided in a common ECU or in separate ECUs. As illustrated in FIG. 2B, for example, controller 101 is provided on PCB 301 and controller 102 is provided on a separate PCB 302. In the illustrated embodiment, and PCB 301 and PCB 302 are provided in a common ECU 303. In other embodiments, PCB 301 and PCB 302 may be provided in separate ECUs or be otherwise separately provided. It shall be further appreciated that the accelerometer in operative communication with controller 102 may be provided on or as a component of PCB 302, such as illustrated by accelerometer 306, may be provided as a component in or of ECU 303 but separate from PCB 302, such as illustrated by accelerometer 306', or may be provided as a separate component from ECU 303, such as illustrated by accelerometer 306".

Figure 2C:
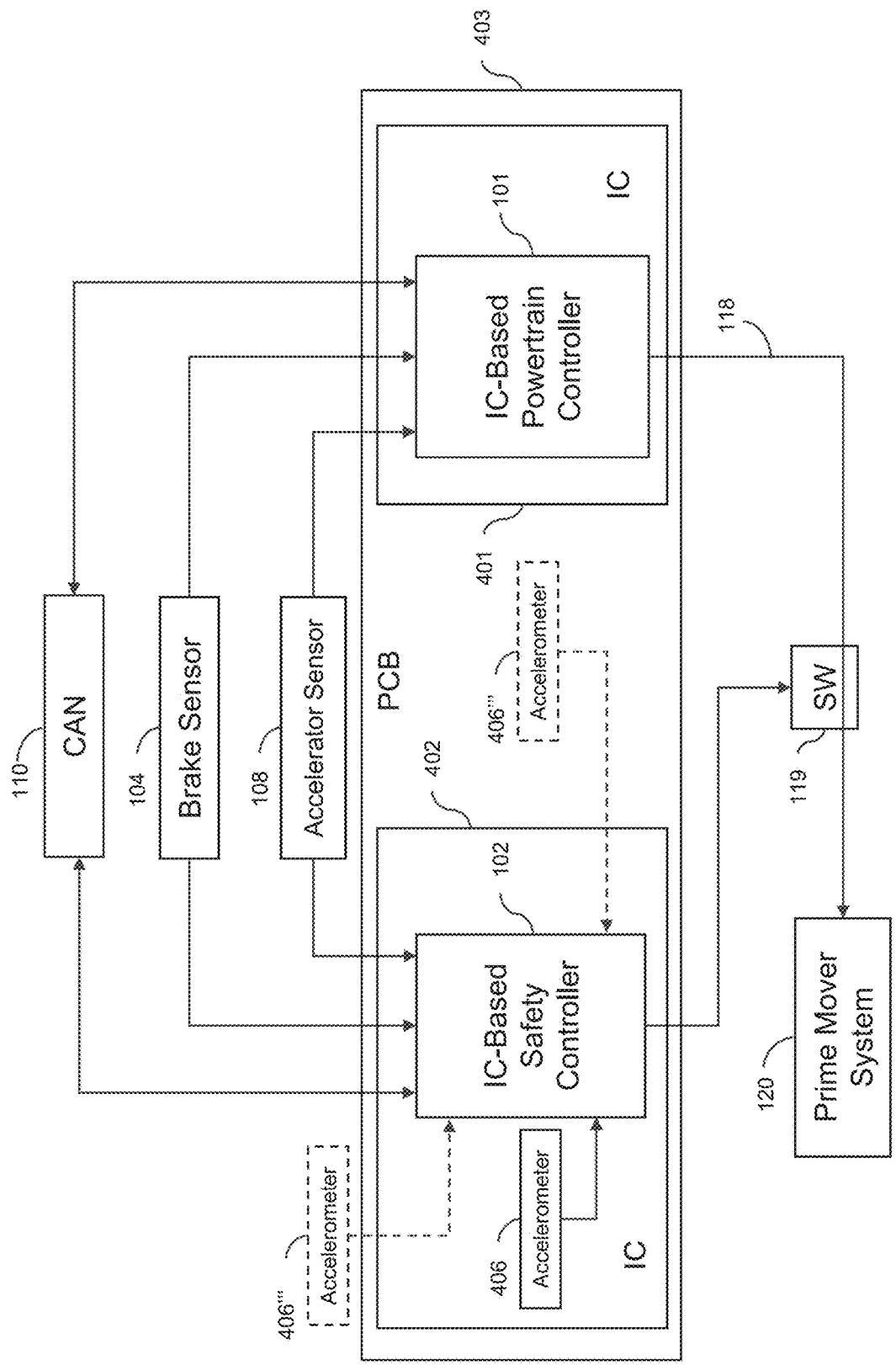

In some example embodiments, controller 101 may be provided as a first integrated circuit (IC) such as an integrated circuit chip or an integrated circuit chipset and controller 102 may be provided as a second IC. In some such embodiments, the first IC and the second IC may be provided as components of a common circuit board such as a common PBC and/or may be provided in a common ECU. As illustrated in FIG. 2C, for example, controller 101 is provided in IC 401 and controller 102 is provided in a separate IC 402. In the illustrated example, and IC 401 and IC 402 are provided on or as components of a common circuit board, such as illustrated by PCB 403. In other forms, IC 301 and IC 302 may be provided on or as components of separate circuit boards or be otherwise separately provided. It shall be further appreciated that the accelerometer in operative communication with controller 102 may be provided on or as a component of IC 402, such as illustrated by accelerometer 406, may be provided as a component on or of PCB 403 but separate from IC 402, such as illustrated by accelerometer 406', or may be provided as a separate component from PCB 403, such as illustrated by accelerometer 406". It shall be further appreciated that in embodiments where IC 401 and IC 402 are provided on or as components of a separate circuit boards, IC 401 and IC 402 and their respective circuit boards may be provided in a common ECU or in separate ECUs.

Figure 3:
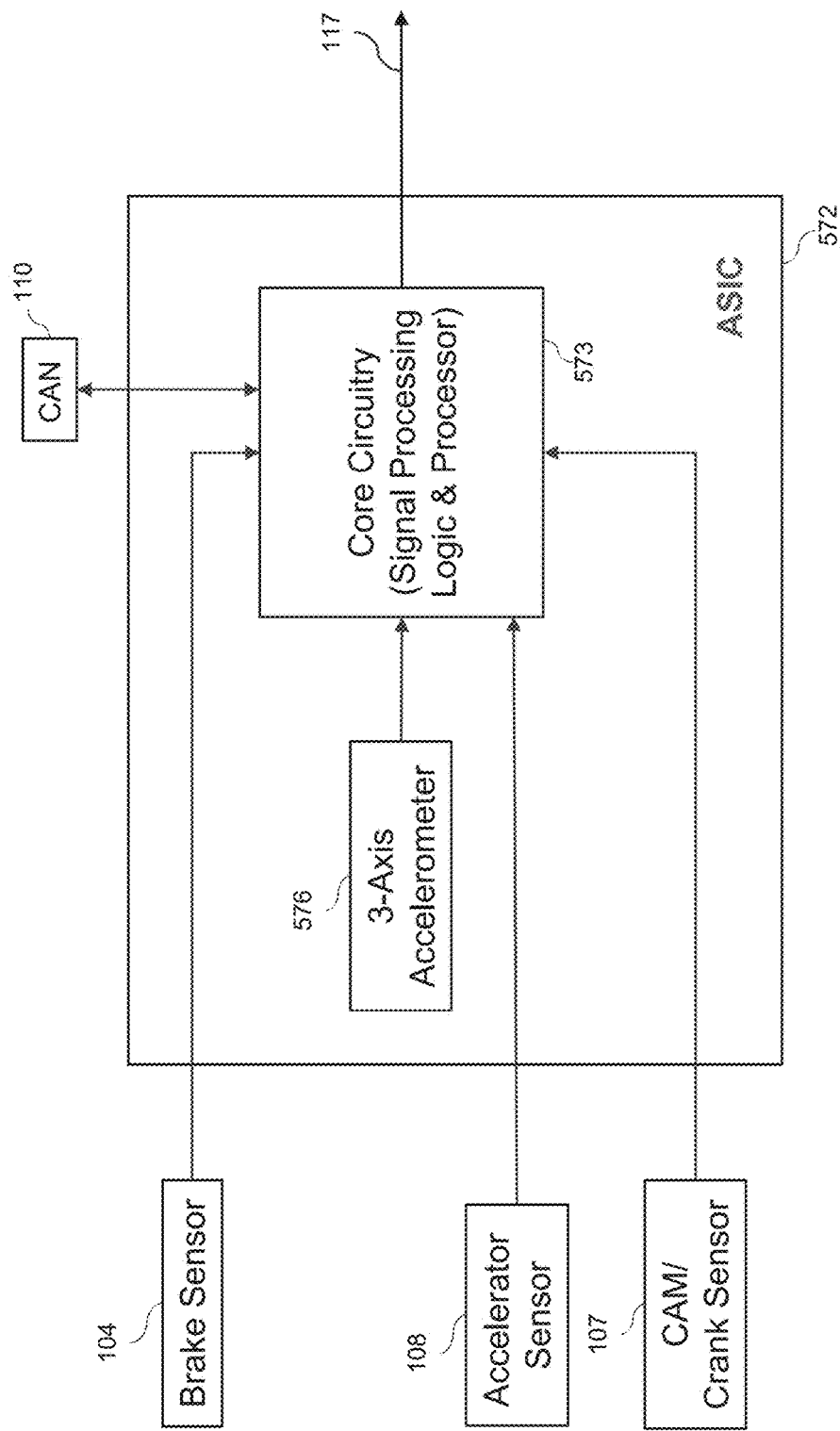
FIG. 3 is a schematic diagram illustrating certain further aspects of an example embodiment according to FIG. 2C.

With reference to FIG. 3, there are illustrated further aspects of an example embodiment according to FIG. 2C. In the illustrated embodiment an application specific integrated circuit (ASIC) 572 is provided with and includes a core circuitry 573 comprising signal processing logic, a processor and other core circuitry, and a three-axis accelerometer 576 as may further be provided with and include other components which are not illustrated including an analog to digital converter, digital interface, memory, oscillators, and a power supply and regulator among other components. Core circuitry 573 may be configured to provide the functions and features of controller 102 as described above. ASIC 572 is in operative communication with and receives input from the three-axis accelerometer 576 which is provided to core circuitry 573. ASIC 572 is also in operative communication with and receives input from brake sensor 104, accelerator sensor 108, and cam or crank angle sensor 107 which are provided to core circuitry 573. Core circuitry logic 573 is also in operative communication with and receives input from and provides output to CAN 110. It shall be appreciated that ASIC 572 or other ASIC-based implementations may be utilized to provide the functions and features of controller 102 in components other than traditional ECUs including, for example, in a smart connector such as disclosed in U.S. Pat. No. 11,031,741 the disclosure of which is hereby incorporated by reference, an independent pig tail-type system, a connector assembly or other component of an accelerator pedal position sensor, a connector assembly or other component of a brake pedal sensor, among other components as will occur to one of skill in the art with the benefit and insight of the present disclosure.

Figure 4A:
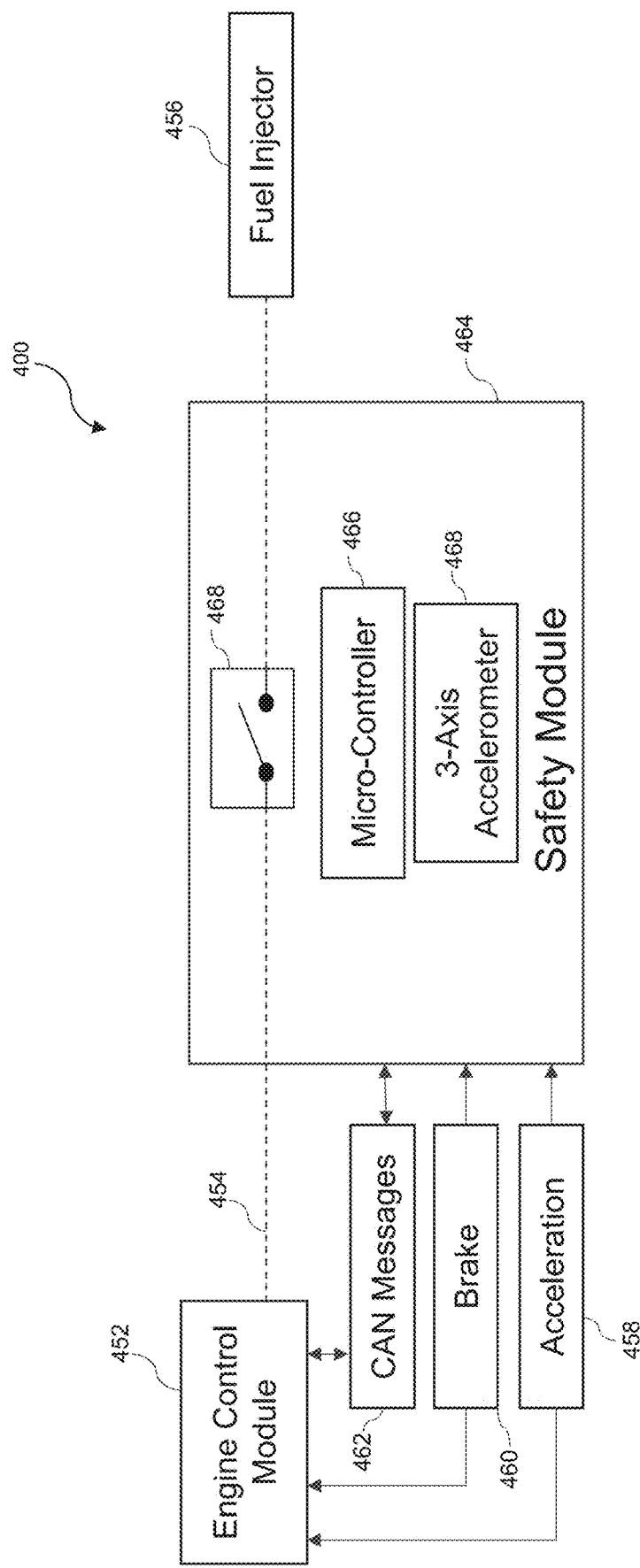
FIGS. 4A and 4B are schematic diagrams illustrating certain aspects of an example vehicle electronic control system.
Figure 4B:
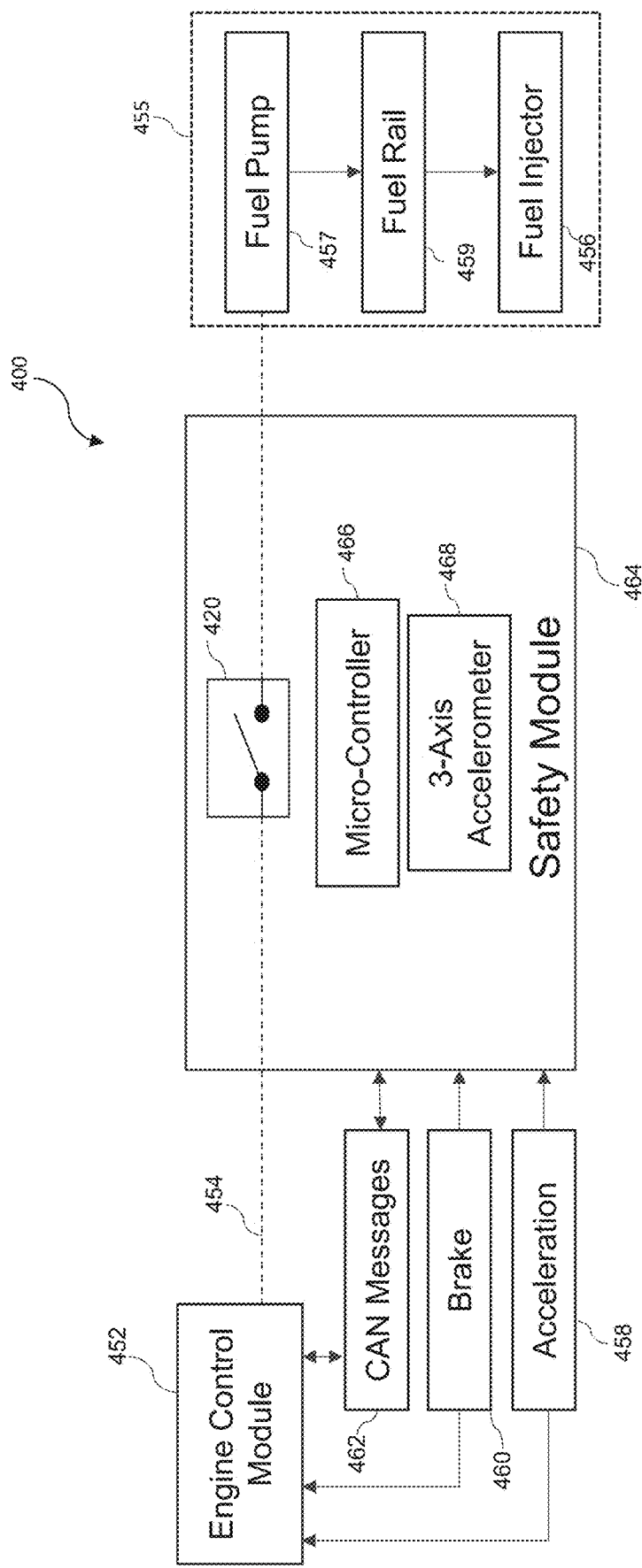

With reference to FIGS. 4A and 4B, there is illustrated a schematic view of an example control system 400 adapted for controlling operation of an engine, such as a reciprocating piston internal combustion engine. In FIG. 4A, control system 400 includes an engine control module 452 which may be an integrated circuit-based electronic controller configured to receive a plurality of inputs for controlling the engine via a datalink 454. For example, the engine control module 452 may provide a control signal to control a fuel injector 456 configured to inject fuel for combustion by the engine. The plurality of inputs may include an acceleration request 458, a braking request 460, and CAN messages 462. In some example aspects, the engine control module 452 may receive inputs corresponding to a pedal position that senses an acceleration signal based on the position of the pedal, and a brake position that senses a brake signal position.

In the illustrated example embodiment, the system 400 includes a safety module 464 configured with an integrated circuit-based electronic controller 466 that operates independently of the engine control module 452. The safety module 464 may be configured to receive the acceleration request 458 and the braking request 460. In the example embodiment, the independent module 464 may be configured with a three-axis accelerometer 468 to receive acceleration outputs. A switch 420 may be provided in the safety module 464 and operatively coupled to the datalink 454. The switch 420 may be a solid-state relay or similar switching device to disconnect communication in the datalink 454.

In this example embodiment, the fuel injector 456 may be driven indirectly via the safety module 464 and thus, connected through the safety module 464 instead of being directly connected to the engine control module 452. In the event unintended acceleration is detected, the safety module 464 may be configured to disconnect the switch 420 to interrupt communication from the engine control module 452 to the fuel injector 456.

In FIG. 4B, there is an illustration of a fuel supply system 455 having the fuel injector 456, a fuel pump 457, and a fuel rail 459 connecting the fuel injector 456 to the fuel pump 457. In this example embodiment, the fuel pump 457 is driven indirectly via the safety module 464 and thus, connected through the safety module 464 instead of being directly connected to the engine control module 452. The safety module 464 may be configured to disconnect the switch 420 to interrupt communication from the engine control module 452 to the fuel pump 457 when unintended acceleration is detected. It shall be appreciated that the modules described in connection with FIG. 5 may be provided in a number of forms including, for example, any of the forms described above in connection with FIGS. 1-3.

Figure 5:
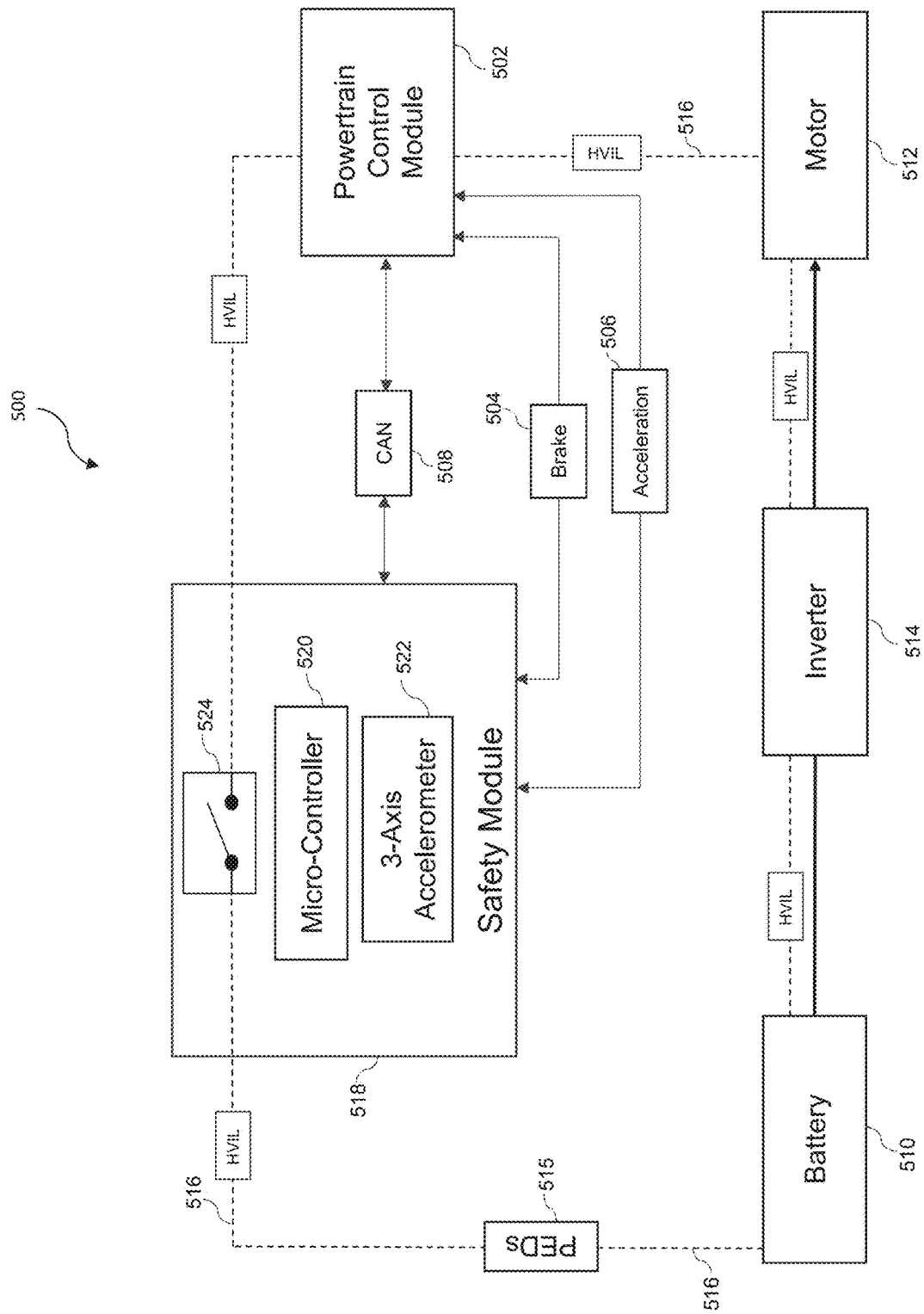
FIG. 5 is a schematic diagram illustrating certain aspects of an example vehicle electronic control system.

With reference to FIG. 5, there is illustrated a schematic view of an example electric vehicle system 500 for preventing unintended acceleration in a vehicle. In FIG. 5, system 500 includes a powertrain control module 502 configured to receive one or more inputs or requests corresponding to brake status 504, acceleration 506, and CAN messages 508 to provide a control signal output for controlling an electric vehicle during unintended acceleration. In the example embodiment, the powertrain control module 502 is configured to control a prime mover component of the system 500 which may include a battery 510, a motor 512, an inverter 514, and other power electronic devices 515. The inverter 514 may be coupled to the battery 510 and the motor 512 and configured to receive power from the battery 510 to drive the motor 512.

System 500 includes a high voltage interlock loop (HVIL) 516 to connect to all of the components in the system 500. It shall be appreciated that the HVIL 516 offers a safety feature in electric vehicle systems. In the example embodiment, a safety module 518 coupled to the HVIL 516 includes an integrated circuit-based electronic controller 520 and a three-axis accelerometer 522 to receive acceleration outputs. The safety module 518 may also be configured to receive signals corresponding to the brake status 504, acceleration 506, and CAN messages 508. An output signal from the battery 510 is routed in the HVIL 516 to the safety module 518. The safety module 518 is configured to receive the battery 510 signal and provide an output through the HVIL 516 to the inverter 514. A switch 524 may be provided in the safety module 518 and operatively coupled to the HVIL 516 to interrupt current flowing through the HVIL 516 when unintended acceleration is detected. While switch 524 is provided in safety module 518 in the example illustration, other example embodiments may provide a switch in other locations in the HVIL 516. It shall be appreciated that once the switch is turned off, current flow in the HVIL 516 is disrupted to disconnect power to motor 512. It shall be appreciated that the modules described in connection with FIG. 5 may be provided in a number of forms including, for example, any of the forms described above in connection with FIGS. 1-3.

Figure 6:
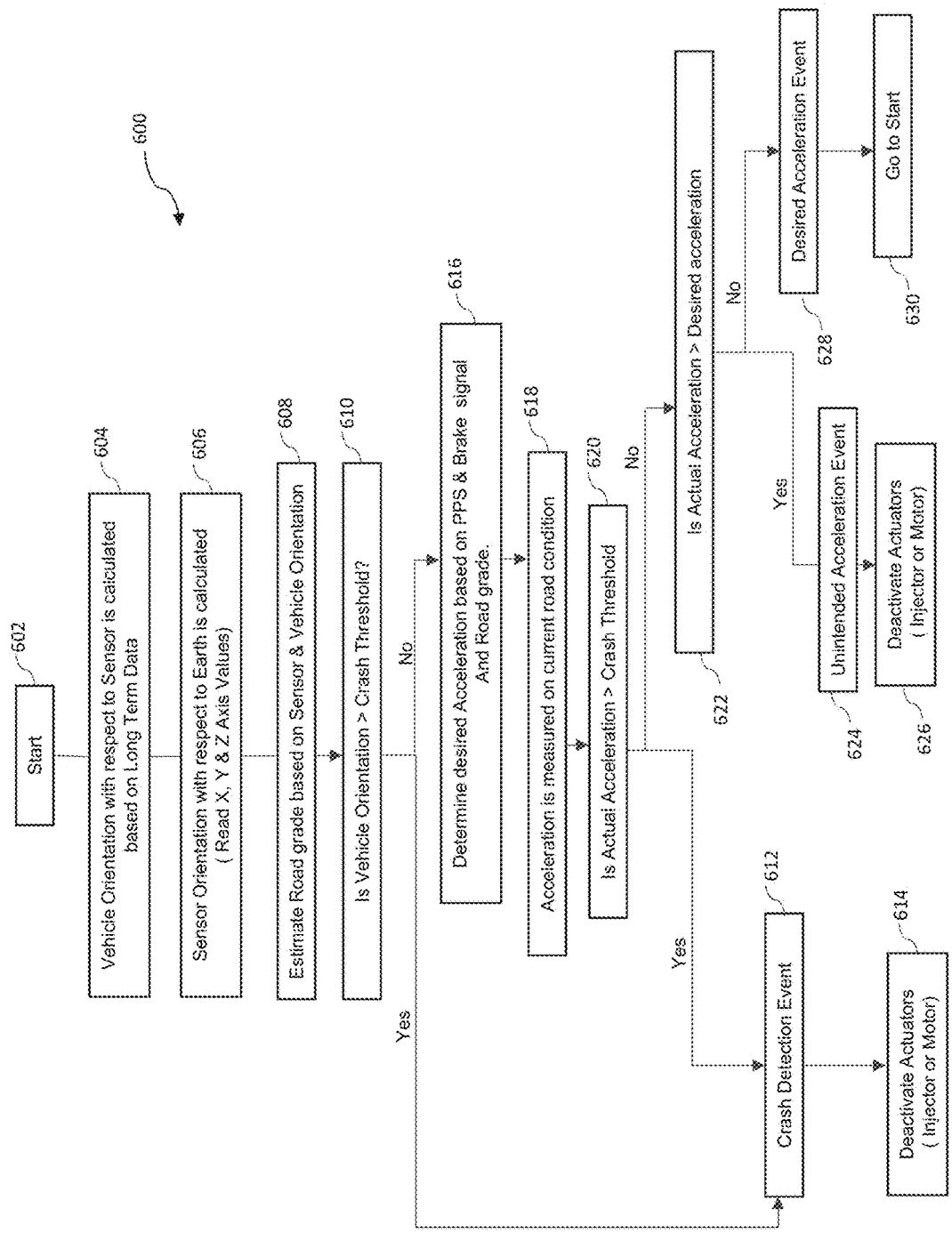
FIG. 6 is a flow diagram illustrating an example process which may be implemented in and performed by a vehicle electronic control system.

With reference to FIG. 6, there is illustrated an example procedure 600 for detecting unintended acceleration. Procedure 600 may be implemented and executed in connection with one or more electronic control system components such as the components described in connection with the embodiments of any of FIGS. 1-5. Procedure 600 begins at start operation 602 and proceeds to operation 604 which calculates vehicle orientation with respect to a three-axis accelerometer based on long-term data. From operation 604, procedure 600 proceeds to operation 606 which calculates an orientation of the three-axis accelerometer with respect to earth by reading x-axis, y-axis, and z-axis values. From operation 606, procedure 600 proceeds to operation 608 which estimates road grade based on orientation of the three-axis accelerometer and vehicle orientation. From operation 608, procedure 600 proceeds to conditional 610 that determines a vehicle orientation limit event in response to output of the three-axis accelerometer. Conditional 610 determines if the vehicle orientation is greater than a vehicle orientation crash threshold. If the vehicle orientation is greater than the vehicle orientation crash threshold, procedure 600 proceeds to operation 612 which detects a crash event. From operation 612, procedure 600 proceeds to operation 614 which deactivates one or more vehicle components such as, for example, the fuel injectors, spark plugs, and the motor.

If the vehicle orientation is less than the vehicle orientation crash threshold, procedure 600 proceeds to operation 616 which determines a desired acceleration based on an acceleration request, brake request, and vehicle road grade. From operation 616, procedure 600 proceeds to operation 618 which determines acceleration based on current road conditions. From operation 618, procedure 600 proceeds to conditional 620 which determines an unintended acceleration event in response to output of the three-axis accelerometer. Conditional 620 determines if an actual acceleration is greater than a vehicle acceleration crash threshold. If the actual acceleration is greater than the vehicle acceleration crash threshold, procedure 600 proceeds to operation 612 which detects a crash event. From operation 612, procedure 600 proceeds to operation 614 which deactivates one or more vehicle components.

If the actual acceleration is less than the vehicle acceleration crash threshold, procedure 600 proceeds to conditional 622 which determines if the actual acceleration is greater than the desired acceleration.

If the actual acceleration is greater than the desired acceleration, procedure 600 proceeds to operation 624 which detects an unintended acceleration event. From operation 624, procedure 600 proceeds to operation 626 which deactivates one or more vehicle components. If the actual acceleration is less than the desired acceleration, procedure 600 proceeds to operation 628 which detects a desired acceleration event. From operation 628, procedure 600 proceeds to operation 630 which continues operation 602.

As illustrated by this detailed description, the present disclosure contemplates a plurality of embodiments, including the following examples. A first example embodiment is a system for controlling a vehicle, the system comprising: a first integrated circuit-based electronic controller configured to receive a plurality of inputs including an acceleration request and a braking request and to provide a control output via a datalink dedicated to controlling a prime mover system of the vehicle; a three-axis accelerometer configured to provide acceleration outputs indicative of acceleration of the accelerometer relative to three axes; and a second integrated circuit-based electronic controller operative independently of the first integrated circuit-based controller configured to receive the acceleration request, the braking request, and the acceleration outputs of the three-axis accelerometer, and operatively coupled with a switch coupled with the datalink, wherein the second integrated circuit-based electronic controller is configured to at least one of: (a) determine a vehicle orientation limit event in response to the acceleration outputs of the three-axis accelerometer and operate the switch to interrupt communication of the control output from the first integrated circuit-based electronic controller to the prime mover system of the vehicle in response to the vehicle orientation limit event, and (b) determine an unintended acceleration event in response to the acceleration outputs of the three-axis accelerometer and at least one of the acceleration request and the braking request, and to operate the switch to interrupt communication of the control output from the first integrated circuit-based electronic controller to the prime mover system of the vehicle in response to the unintended acceleration event.

A second example embodiment includes the features of the first example embodiment, wherein the prime mover system includes a fueling supply system, and the second integrated circuit-based electronic controller operates the switch to interrupt communication of the control output from the first integrated circuit-based electronic controller to the fuel supply system in response to the unintended acceleration event.

A third example embodiment includes the features of the second example embodiment, wherein the fueling supply system includes a fuel injector and, in response to the unintended acceleration event, the second integrated circuit-based electronic controller is configured to disconnect control output from the first integrated circuit-based electronic controller to the fuel injector.

A fourth example embodiment includes the features of the second example embodiment, wherein the fueling supply system includes a fuel pump and, in response to the unintended acceleration event, the second integrated circuit-based electronic controller is configured to disconnect control output from the first integrated circuit-based electronic controller to the fuel pump.

A fifth example embodiment includes the features of the first example embodiment, wherein the second integrated circuit-based electronic controller is configured to determine vehicle orientation limit event by evaluating whether a vehicle orientation determined in response to output of the three-axis accelerometer exceeding a vehicle orientation crash threshold.

A sixth example embodiment includes the features of the first example embodiment, wherein the second integrated circuit-based electronic controller is configured to determine the unintended acceleration event by evaluating whether an actual acceleration determined in response to output of the three-axis accelerometer differs from a desired acceleration determined in response to one or both of the acceleration request and the braking request by a difference threshold.

A seventh example embodiment includes the features of the first example embodiment, wherein the second integrated circuit-based electronic controller is configured to determine the unintended acceleration event by evaluating whether an actual acceleration determined in response to output of the three-axis accelerometer exceeding a vehicle acceleration crash threshold.

An eighth example embodiment includes the features of the first example embodiment, wherein the second integrated circuit-based electronic controller is configured to both (a) determine the vehicle orientation limit event and (b) determine the unintended acceleration event.

A ninth example embodiment is a method for controlling a vehicle, the method comprising: operating a first integrated circuit-based electronic controller to receive a plurality of inputs including at least one of an acceleration request and a braking request and to provide a control output via a datalink dedicated to control a prime mover system of the vehicle; operating a three-axis accelerometer configured to provide acceleration outputs indicative of acceleration of the accelerometer relative to three axes; and operating a second integrated circuit-based electronic controller independently of the first integrated circuit-based controller to receive the acceleration request, the braking request, and the acceleration outputs of the three-axis accelerometer to at least one of: (a) determine a vehicle orientation limit event in response to the acceleration outputs of the three-axis accelerometer and operate a switch operatively coupled with the datalink to interrupt communication of the control output from the first integrated circuit-based electronic controller to the prime mover system of the vehicle in response to the vehicle orientation limit event, and (b) determine an unintended acceleration event in response to the acceleration outputs of the three-axis accelerometer and at least one of the acceleration request and the braking request and to operate the switch to interrupt communication of the control output from the first integrated circuit-based electronic controller to the prime mover system of the vehicle in response to the unintended acceleration event.

A tenth example embodiment includes the features of the ninth example embodiment, wherein the operating the second integrated circuit-based electronic controller includes operating the switch to interrupt communication of the control output from the first integrated circuit-based electronic controller to a fuel supply system of the prime mover system in response to the unintended acceleration event.

An eleventh example embodiment includes the features of the tenth example embodiment, wherein the operating the switch includes disconnecting a control output from the first integrated circuit-based electronic controller to a fuel injector.

A twelfth example embodiment includes the features of the tenth example embodiment, wherein the operating the switch includes disconnecting a control output from the first integrated circuit-based electronic controller to a fuel pump.

A thirteenth example embodiment includes the features of the ninth example embodiment, wherein the operating the second integrated circuit-based electronic controller to determine vehicle orientation limit includes evaluating whether a vehicle orientation determined in response to output of the three-axis accelerometer exceeding a vehicle orientation crash threshold.

A fourteenth example embodiment includes the features of the ninth example embodiment, wherein the operating the second integrated circuit-based electronic controller to determine the unintended acceleration event includes evaluating whether an actual acceleration determined in response to output of the three-axis accelerometer differs from a desired acceleration determined in response to one or both of the acceleration request and the braking request by a difference threshold.

A fifteenth example embodiment includes the features of the ninth example embodiment, wherein the operating the second integrated circuit-based electronic controller to determine the unintended acceleration event includes evaluating whether an actual acceleration determined in response to output of the three-axis accelerometer exceeding a vehicle acceleration crash threshold.

A sixteenth example embodiment includes the features of the ninth example embodiment, and comprises operating the second integrated circuit-based electronic controller is configured to both (a) determine the vehicle orientation limit event and (b) determine the unintended acceleration event.

A seventeenth example embodiment is a system for controlling a vehicle, the system comprising: a first integrated circuit-based electronic controller configured to receive a plurality of inputs including an acceleration request and a braking request and to provide a control output to control a prime mover component of an electric vehicle system; a high voltage interlock loop (HVIL) operatively coupled with the first integrated circuit-based electronic controller; a three-axis accelerometer to provide acceleration outputs indicative of acceleration of the accelerometer relative to three dimensions; and a second integrated circuit-based electronic controller operative independently of the first integrated circuit-based controller and configured to receive the acceleration request, the braking request, configured to receive the acceleration outputs of the three-axis accelerometer, and operatively coupled with a switch coupled with the HVIL, wherein the second integrated circuit-based electronic controller is configured to at least one of: (a) determine a vehicle orientation limit event in response to the acceleration outputs of the three-axis accelerometer and operate the switch to interrupt current flowing through the HVIL in response to the vehicle orientation limit event, and (b) determine an unintended acceleration event in response to the acceleration outputs of the three-axis accelerometer and at least one of the acceleration request and the braking request, and to operate the switch to interrupt current flowing through the HVIL in response to the unintended acceleration event.

An eighteenth example embodiment includes the features of the seventeenth example embodiment, wherein the prime mover component includes a battery, a motor, and an inverter connecting the battery to the motor and receiving power from the battery to drive the motor.

A nineteenth example embodiment includes the features of the eighteenth example embodiment, wherein the HVIL is operatively coupled with the first integrated circuit-based electronic controller, the second integrated circuit-based electronic controller, and a traction motor of the vehicle.

A twentieth example embodiment includes the features of the nineteenth example embodiment, wherein the HVIL is operatively coupled with power electronics and a battery system of the vehicle.

A twenty-first example embodiment is a method for controlling a vehicle, the method comprising: operating a first integrated circuit-based electronic controller to receive a plurality of inputs including at least one of an acceleration request and a braking request and to provide a control output to control a prime mover component of an electric vehicle system; operating a high voltage interlock loop (HVIL) operatively coupled with the first integrated circuit-based electronic controller to allow control of the prime mover component; operating a three-axis accelerometer to provide acceleration outputs indicative of acceleration of the accelerometer relative to three dimensions; and operating a second integrated circuit-based electronic controller independently of the first integrated circuit-based controller and to receive the at least one of an acceleration request and a braking request and the acceleration outputs of the three-axis accelerometer, and at least one of (a) determine a vehicle orientation limit event in response to the acceleration outputs of the three-axis accelerometer and operate a switch operatively coupled with the HVIL to interrupt current flowing through the HVIL in response to the vehicle orientation limit event, and (b) determine an unintended acceleration event in response to the acceleration outputs of the three-axis accelerometer and at least one of the acceleration request and the braking request, and operate the switch to interrupt current flowing through the HVIL in response to the unintended acceleration event.

A twenty-second example embodiment includes the features of the twenty-first example embodiment, wherein the operating a first integrated circuit-based electronic controller to provide the control output is effective to operate an inverter to drive a motor using power received from a battery.

A twenty-third example embodiment includes the features of the twenty-second example embodiment, wherein the operating the HVIL includes selectably closing and opening a circuit including the first integrated circuit-based electronic controller, the second integrated circuit-based electronic controller, and a traction motor of the vehicle.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system for controlling a vehicle, the system comprising:
    a first integrated circuit-based electronic controller configured to receive a plurality of inputs including an acceleration request and a braking request and to provide a control output via a datalink dedicated to controlling a prime mover system of the vehicle;
    a three-axis accelerometer configured to provide acceleration outputs indicative of acceleration of the accelerometer relative to three axes; and
    a second integrated circuit-based electronic controller operative independently of the first integrated circuit-based controller configured to receive the acceleration request, the braking request, and the acceleration outputs of the three-axis accelerometer, and operatively coupled with a switch coupled with the datalink,
    wherein the second integrated circuit-based electronic controller is configured to at least one of:
    (a) determine a vehicle orientation limit event in response to the acceleration outputs of the three-axis accelerometer and operate the switch to interrupt communication of the control output from the first integrated circuit-based electronic controller to the prime mover system of the vehicle in response to the vehicle orientation limit event, and
    (b) determine an unintended acceleration event in response to the acceleration outputs of the three-axis accelerometer and at least one of the acceleration request and the braking request, and to operate the switch to interrupt communication of the control output from the first integrated circuit-based electronic controller to the prime mover system of the vehicle in response to the unintended acceleration event.

2. The system of claim 1, wherein the prime mover system includes a fueling supply system, and the second integrated circuit-based electronic controller operates the switch to interrupt communication of the control output from the first integrated circuit-based electronic controller to the fuel supply system in response to the unintended acceleration event.

3. The system of claim 2, wherein the fueling supply system includes a fuel injector and, in response to the unintended acceleration event, the second integrated circuit-based electronic controller is configured to disconnect control output from the first integrated circuit-based electronic controller to the fuel injector.

4. The system of claim 2, wherein the fueling supply system includes a fuel pump and, in response to the unintended acceleration event, the second integrated circuit-based electronic controller is configured to disconnect control output from the first integrated circuit-based electronic controller to the fuel pump.

5. The system of claim 1, wherein the second integrated circuit-based electronic controller is configured to determine vehicle orientation limit event by evaluating whether a vehicle orientation determined in response to output of the three-axis accelerometer exceeding a vehicle orientation crash threshold.

6. The system of claim 1, wherein the second integrated circuit-based electronic controller is configured to determine the unintended acceleration event by evaluating whether an actual acceleration determined in response to output of the three-axis accelerometer differs from a desired acceleration determined in response to one or both of the acceleration request and the braking request by a difference threshold.

7. The system of claim 1, wherein the second integrated circuit-based electronic controller is configured to determine the unintended acceleration event by evaluating whether an actual acceleration determined in response to output of the three-axis accelerometer exceeding a vehicle acceleration crash threshold.

8. The system of claim 1, wherein the second integrated circuit-based electronic controller is configured to both (a) determine the vehicle orientation limit event and (b) determine the unintended acceleration event.

9. A method for controlling a vehicle, the method comprising:
  operating a first integrated circuit-based electronic controller to receive a plurality of inputs including at least one of an acceleration request and a braking request and to provide a control output via a datalink dedicated to control a prime mover system of the vehicle;
  operating a three-axis accelerometer configured to provide acceleration outputs indicative of acceleration of the accelerometer relative to three axes; and
  operating a second integrated circuit-based electronic controller independently of the first integrated circuit-based controller to receive the acceleration request, the braking request, and the acceleration outputs of the three-axis accelerometer to at least one of: (a) determine a vehicle orientation limit event in response to the acceleration outputs of the three-axis accelerometer and operate a switch operatively coupled with the datalink to interrupt communication of the control output from the first integrated circuit-based electronic controller to the prime mover system of the vehicle in response to the vehicle orientation limit event, and (b) determine an unintended acceleration event in response to the acceleration outputs of the three-axis accelerometer and at least one of the acceleration request and the braking request and to operate the switch to interrupt communication of the control output from the first integrated circuit-based electronic controller to the prime mover system of the vehicle in response to the unintended acceleration event.

10. The method of claim 9, wherein the operating the second integrated circuit-based electronic controller includes operating the switch to interrupt communication of the control output from the first integrated circuit-based electronic controller to a fuel supply system of the prime mover system in response to the unintended acceleration event.

11. The method of claim 10, wherein the operating the switch includes disconnecting a control output from the first integrated circuit-based electronic controller to a fuel injector.

12. The method of claim 10, wherein the operating the switch includes disconnecting a control output from the first integrated circuit-based electronic controller to a fuel pump.

13. The method of claim 9, wherein the operating the second integrated circuit-based electronic controller to determine vehicle orientation limit includes evaluating whether a vehicle orientation determined in response to output of the three-axis accelerometer exceeding a vehicle orientation crash threshold.

14. The method of claim 9, wherein the operating the second integrated circuit-based electronic controller to determine the unintended acceleration event includes evaluating whether an actual acceleration determined in response to output of the three-axis accelerometer differs from a desired acceleration determined in response to one or both of the acceleration request and the braking request by a difference threshold.

15. The method of claim 9, wherein the operating the second integrated circuit-based electronic controller to determine the unintended acceleration event includes evaluating whether an actual acceleration determined in response to output of the three-axis accelerometer exceeding a vehicle acceleration crash threshold.

16. The method of claim 9, comprising operating the second integrated circuit-based electronic controller is configured to both (a) determine the vehicle orientation limit event and (b) determine the unintended acceleration event.

17. A system for controlling a vehicle, the system comprising:
  a first integrated circuit-based electronic controller configured to receive a plurality of inputs including an acceleration request and a braking request and to provide a control output to control a prime mover component of an electric vehicle system;
  a high voltage interlock loop (HVIL) operatively coupled with the first integrated circuit-based electronic controller;
  a three-axis accelerometer to provide acceleration outputs indicative of acceleration of the accelerometer relative to three dimensions; and
  a second integrated circuit-based electronic controller operative independently of the first integrated circuit-based controller and configured to receive the acceleration request, the braking request, configured to receive the acceleration outputs of the three-axis accelerometer, and operatively coupled with a switch coupled with the HVIL,
  wherein the second integrated circuit-based electronic controller is configured to at least one of:
  (a) determine a vehicle orientation limit event in response to the acceleration outputs of the three-axis accelerometer and operate the switch to interrupt current flowing through the HVIL in response to the vehicle orientation limit event, and
  (b) determine an unintended acceleration event in response to the acceleration outputs of the three-axis accelerometer and at least one of the acceleration request and the braking request, and to operate the switch to interrupt current flowing through the HVIL in response to the unintended acceleration event.

18. The system of claim 17, wherein the prime mover component includes a battery, a motor, and an inverter connecting the battery to the motor and receiving power from the battery to drive the motor.

19. The system of claim 18, wherein the HVIL is operatively coupled with the first integrated circuit-based electronic controller, the second integrated circuit-based electronic controller, and a traction motor of the vehicle.

20. The system of claim 19, wherein the HVIL is operatively coupled with power electronics and a battery system of the vehicle.

21. A method for controlling a vehicle, the method comprising:
  operating a first integrated circuit-based electronic controller to receive a plurality of inputs including at least one of an acceleration request and a braking request and to provide a control output to control a prime mover component of an electric vehicle system;

operating a high voltage interlock loop (HVIL) operatively coupled with the first integrated circuit-based electronic controller to allow control of the prime mover component;

operating a three-axis accelerometer to provide acceleration outputs indicative of acceleration of the accelerometer relative to three dimensions; and operating a second integrated circuit-based electronic controller independently of the first integrated circuit-based controller and to receive the at least one of an acceleration request and a braking request and the acceleration outputs of the three-axis accelerometer, and at least one of (a) determine a vehicle orientation limit event in response to the acceleration outputs of the three-axis accelerometer and operate a switch operatively coupled with the HVIL to interrupt current flowing through the HVIL in response to the vehicle orientation limit event, and (b) determine an unintended acceleration event in response to the acceleration outputs of the three-axis accelerometer and at least one of the acceleration request and the braking request, and operate the switch to interrupt current flowing through the HVIL in response to the unintended acceleration event.

22. The method of claim 21, wherein the operating a first integrated circuit-based electronic controller to provide the control output is effective to operate an inverter to drive a motor using power received from a battery.

23. The method of claim 22, wherein the operating the HVIL includes selectably closing and opening a circuit including the first integrated circuit-based electronic controller, the second integrated circuit-based electronic controller, and a traction motor of the vehicle.

* * * * *